June 14, 1932.   G. W. BATCHELL   1,863,095
FEEDING MOLTEN GLASS
Filed Nov. 7, 1928
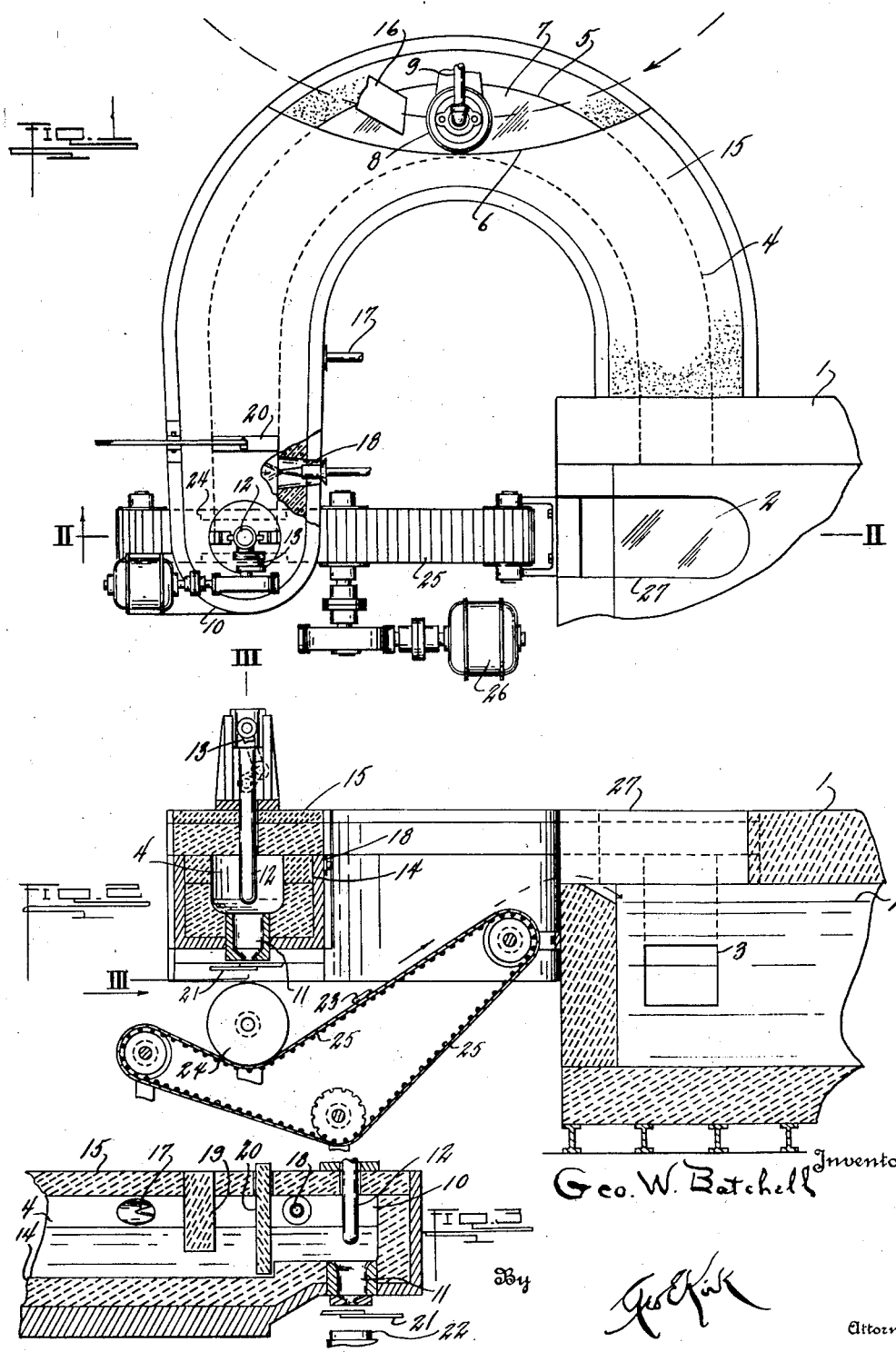

Patented June 14, 1932

1,863,095

UNITED STATES PATENT OFFICE

GEORGE W. BATCHELL, OF TOLEDO, OHIO

FEEDING MOLTEN GLASS

Application filed November 7, 1928. Serial No. 317,808.

This invention relates to molten glass supply for manufacture.

This invention has utility when incorporated in molten glass flow and temperature control in providing from a fixed trough a uniformly fluid exposed region adapted for top or suction gather, while additionally there may be further molten glass removed, say for downward flow off as gob gathering.

Referring to the drawing:

Fig. 1 is a plan view, with parts broken away, of an embodiment of the invention;

Fig. 2 is a partial section on the line II—II, Fig. 1; and

Fig. 3 is a partial section on the line III—III, Fig. 2.

Glass furnace or tank 1 may have therein pool 2 as a supply of molten glass. From this pool there may be opening 3 in communication with way 4 as a trough, herein shown as having direction change region 5 with open top 6, there to expose upper surface 7 of the molten glass from the supply 2, so that gather cup 8 with suction line 9 thereon may upwardly lift or remove a gather of glass in the travel of the machine say in continuous operation past said region of exposed molten glass. The way 4 as continuing past the region 5 extends to terminal 10 shown as having draw-off or bottom discharge opening 11 adjacent which may be operable accelerating means or draw-off control plunger 12 as reciprocated by device 13.

The furnace 1 is lined with heat-resistant refractory material. Likewise, the way 4, 5, 10, is lined with refractory material 14. Additionally, the way 4 is provided with roof or cover 15 for holding the heat. The location of the opening 3 is so that it serves as a skimmer against surface impurities flowing into the way 4.

After the removal of glass at the open surface region 7, there is tendency of the glass to blister or become seedy or bubbles form therein, due to the chilling action resultant from the gather or from the lift of the glass at the gather before severing by shear 16. To minimize the effect of this chilling, especially if there is to be use of this molten stream of glass from the discharge 11, reheating may occur by burners 17, 18. Additionally, the trough or way 4 may have skimmer 19 between the top surface gather opening 7 and discharge region 11, thereby permitting fining or clarifying of the glass so that gob gathering may occur at region 11 for dual use of this feature.

In the event the device is to be discontinued as to operation, there may not be necessity for freezing the plunger 12 in the discharge outlet 11, for dam 20 may be lowered in advance of the flow off or discharge outlet 11. In the event the discharge outlet 11 is used for gob gathering for feeding an additional ware machine, shears 21 may be operated in synchronism with the machine as the blank mold or gather cup 22 is in proper registry therewith.

Should it be not desired to have this second glassware forming machine supplied, the maintained flow in the way 4 may be effected through the discharge 11, with the discharge 11 so controlled that there may be sufficiently rapid flow of the stream of molten glass in the machine 7. This flow-off may be cut by shears 21 to form sections or gobs 23 to drop between guide rollers 24 upon conveyor belt 25 as operated at a high speed from motor 26 for causing quick travel of such gobs 23 and throwing discharge thereof through opening 27 back into the pool 2 of the supply tank 1 for re-heating. Other disposition of this glass, as cullet, may be adopted as preferred.

It is accordingly seen that molten glass may be supplied by this feeder disclosure to a suction gather glass forming machine of the Owens type, and a gob receiving glass forming machine of the O'Neill type.

What is claimed and it is desired to secure by United States Letters Patent is:

1. Molten glass supply means, a way therefrom provided intermediate its length with an exposed port for removal of molten glass from the upper surface of the glass in said way, and therebeyond provided with a port for the removal of glass from the way bottom, there being control means for the latter port, receiving means for the molten glass from the latter port, and reheating means between said ports.

2. Molten glass supply means, a way therefrom, said way having an upper port for upper surface removal of molten glass from the way, said way additionally having continuous therewith a lower port spaced from the upper port for molten glass removal, said way providing a path for the flow of molten glass from the supply means past the upper port to the lower port, and a conveyor from the lower port to the supply means.

3. Molten glass supply means, a way therefrom, said way having intermediate its length an upper port exposing the upper surface of the molten glass in the way for upper surface upward withdrawal of molten glass from the way, said way therebeyond having continuous therewith a gravity flow-off lower port for molten glass removal, said way providing a path for the flow of molten glass from the supply means past the upper port to the lower port, and a conveyor from the lower port for returning excess flow from the way to the supply means.

In witness whereof I affix my signature.

GEORGE W. BATCHELL.